United States Patent [19]

Hartman

[11] 3,894,861

[45] July 15, 1975

[54] GRASS GROWTH CONTROL COMPOSITIONS

[75] Inventor: Frederick Anthony Hartman, Cincinnati, Ohio

[73] Assignee: The Procter & Gamble Company, Cincinnati, Ohio

[22] Filed: May 21, 1973

[21] Appl. No.: 361,938

[52] U.S. Cl. .................................... 71/76; 71/86
[51] Int. Cl. ................................. A01n 9/36
[58] Field of Search .................................. 71/76, 86

[56] References Cited
OTHER PUBLICATIONS
Ryzhkov et al. Chem. Abst. Vol. 49 3404a.

Primary Examiner—Lewis Gotts
Assistant Examiner—Catherine L. Mills
Attorney, Agent, or Firm—John B. Goodman

[57] ABSTRACT

Compositions and methods for controlling the growth of grasses employing aminomethylphosphonate compounds.

2 Claims, No Drawings

GRASS GROWTH CONTROL COMPOSITIONS

BACKGROUND OF THE INVENTION

The present invention relates to compositions and methods for controlling the growth of grasses. More particularly the invention relates to the use of aminomethylphosphonic acid and its salts and esters in grass growth retardant compositions.

Many natural or synthetic substances are now being applied to effect changes in the growth of plants. Such compounds are broadly classified as "plant growth regulators", and include compounds which exhibit a wide range of plant responses. Thus the term "growth regulant" generically includes herbicides, fruit abscissors, latex stimulants, growth stimulants, growth retardants, and the like. Although each term connotes a distinct biological response, there is inevitable overlap among even sub-generic terms. For example, herbicides normally lethal may be only retardant at low concentrations or on certain plant species. As a result the terms are often imperfectly used or confused. Among the plethora of so called plant growth regulators, aminomethylphosphonate-type compounds have been suggested as growth regulants. Current interest has centered on the rather exotic derivatives of aminomethylphosphonic acid. Heretofore such compounds have been broadly disclosed as growth regulants, herbicides, and the like. For example, Monsanto Technical Bulletin MON-057-1-71 and U.S. Pat. No. 3,455,675 disclose phosphonomethylglycines as "broad spectrum herbicides"; U.S. Pat. No. 3,627,507 discloses carbamoylphosphonates as growth regulants; U.S. Pat. No. 3,556,762 discloses glycine phosphonates as "carbohydrate regulants"; and British Pat. No. 1,243,316 discloses cyclohexylamine phosphonates as "herbicidal agents". These previously disclosed regulants suffer from one or more deficiencies when applied specifically to grasses. For example, many known growth regulants are so ineffective as to require excessive, uneconomic application; they often result in uneven growth and appearance; and finally, they are often expensive and therefore commercially limited.

In contrast, it has now been found that aminomethylphosphonic acid, its salts and its esters are suprisingly effective as longitudinal growth retardants for grasses. That is to say, aminomethylphosphonic acid, its salts, and its esters can be utilized to retard the growth rate, as well as the ultimate size, of grasses. An effective reduction in grass growth represents significant savings in the time and equipment previously required to maintain the attractive appearance of homes, highways, and recreational areas. It is accordingly an object of the instant invention to provide an effective, yet safe and economical, method for retarding the growth of grasses.

Moreover, it has been discovered that the aminomethylphosphonates described herein increase the vegetative growth of grasses from the grass crown area providing a fuller, richer appearance. Thus, in contrast to phytotoxic substances, aminomethylphosphonic acid, its salts, and its esters have the unique ability to retard grass growth without substantial harmful side effects. It is accordingly a second object of the instant invention to provide an effective, yet safe and economical, method for retarding the longitudinal growth of grasses which does not adversely affect vegetative growth.

The instant invention is also useful in the grain (cereal grasses) industry by retarding longitudinal growth of grain stalks. Lodging, i.e., premature breaking and bending of the grain stalk due to climatic conditions, is a well recognized problem and accounts for considerable grain loss prior to and during harvesting expecially in later stages of stalk development. Heretofore, the problems associated with lodging have been alleviated, for example, by means of genetic mutation to produce hybrids having shorter stalks. However, such genetic mutation has rendered the hybrid grains increasingly susceptible to disease. It is accordingly another object of the present invention to provide a method for retarding longitudinal growth of cereal grasses thereby reducing the loss of grain due to lodging without adversely influencing disease resistance.

These and other objects are obtained by this invention as will be seen by the following disclosure.

SUMMARY OF THE INVENTION

This invention encompasses compositions for retarding the growth rate of grasses comprising a safe and effective amount of an aminomethylphosphonate compound selected from the group consisting of aminomethylphosphonic acid, and the non-phytotoxic salts and esters thereof; a non-phytotoxic, plant-compatible carrier; and a non-phytotoxic, plant-compatible surface active agent.

A second aspect of this invention relates to processes for retarding the growth rate of grasses comprising applying thereto said aminomethylphosphonates, preferably in combination with suitable agricultural carriers, surface active agents, and adjuvants and modifiers such as fertilizers, herbicides, anti-microbials, insecticides, and the like.

DETAILED DESCRIPTION OF THE INVENTION

This invention relates to compositions and processes for controlling the growth of grasses. As used herein the term "grasses" includes any species of the family Gramineae of monocotyledonous, mostly herbaceous plants with jointed stems, slender and sheathing leaves, and flowers (if any) borne in bracts. It is well known that over 10,000 individual species of grass have been identified. Nonetheless, the aminomethylphosphonates defined herein are safe and effective in use with all grass species. Common families of grass which show substantial growth regardation when contacted by the aminomethylphosphonates of the instant invention include, for example, Bluegrasses such as Kentucky, Rough, Canada, Annual, Upland, Wood, and Bulbous; Fescues such as Red, Chewings, Sheep, Hard, Hair, Tall, and Meadow; Ryegrasses such as Perennial, and Italian, Bentgrasses such as Creeping, Colonial, Velvet, Redtop, and South German Mixed; Bermudagrasses such as Bayshore, Everglades, Santa Anna, and Tigway; Zoysiagrasses; Centipedegrasses; Carpetgrasses; and Bahiagrasses. The Bluegrasses, Fescues, Ryegrasses, St. Augustinegrasses and Bermudagrasses are particularly suited for effective retardation by the aminomethylphosphonates described herein. The most important grasses for purposes of this invention are Kentucky Bluegrasses such as Park, Nugget, Newport, Merian, Windsor, Troy, Delta, Fylking, and Pennster; Red Fescue; Chewings Fescue; Tall Fescue; Perennial Ryegrasses such as Manhattan; and Bermudagrasses. As defined herein the term "grass" also includes the cereal grasses (grains) such as wheat, oats, barley, rice, corn and rye-grain. The more important grains for purposes of the present invention include wheat, oats, corn and rice.

The aminomethylphosphonates used herein are of the formula:

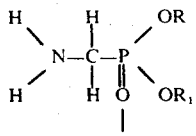

wherein R and $R_1$ are each selected from the group consisting of hydrogen, non-phytotoxic plant-compatible cations, and straight or branched chain alkyl.

The aminomethylphosphonate compounds described herein can be prepared by well-known procedures. For example, aminomethylphosphonic acid (AMPA) can be prepared by reaction of N-bromomethylphthalimide with sodium alkylphosphite in the manner of Chavane, Ann. Chim. [12] 4, 352-64 (1959). The various AMPA salts useful herein can be prepared by standard methods of acid-base neutralization. The term "salts" is intended to encompass the AMPA compounds wherein either R or $R_1$, or both, are cations other than hydrogen. The neutralization of AMPA using two equivalents of the selected base will yield the corresponding salt with R and $R_1$ as cations; neutralization of AMPA using one equivalent of the selected base will yield the corresponding mono-salt. The term "esters" is intended to encompass AMPA compounds wherein either R or $R_1$, or both, are lower straight of branched chain alkyl preferably containing from about one to five carbon atoms. The various AMPA esters useful herein can be prepared by standard methods. For example, the diesters, wherein both R and $R_1$ are alkyl, can be prepared by reacting equimolar amounts of formaldehyde and the appropriate dialkylphosphite in an ethanol/ammonium media. The monoesters can be prepared by refluxing the diester with excess aqueous sodium hydroxide with subsequent neutralization.

The most preferred compound of the present invention is aminomethylphosphonic acid, i.e., wherein both R and $R_1$ are hydrogen.

In practice, the AMPA salts described herein as grass growth retardants can be selected for use according to water solubility. For use as immediate release grass growth retardants the AMPA salts are preferably water-soluble. As a water-soluble salt the retardant is released and is available to the grass at the time of application. Such water-soluble AMPA salts include the mono- and disubstituted alkali metal salts such as the sodium aminomethylphosphonates, potassium aminomethylphosphonates, cesium aminomethylphosphonates, lithium aminomethylphosphonates, and rubidium aminomethylphosphonates. Various water-soluble ammonium salts of AMPA, wherein the cation is $N(R')_4$, are also suitable for use herein. These include, for example, the water-soluble alkylammonium, alkanolammonium, and arylammonium salts of AMPA. It is understood that the water-solubility of ammonium salts is largely dependent on the number and nature of the substituent groups on the nitrogen atoms. In general, and as used herein, water-soluble ammonium salts include those wherein each R' is either hydrogen or $C_1$ to about $C_{10}$ hydrocarbyl. Non-limiting examples of non-phytotoxic, water-soluble ammonium salts of AMPA useful herein include the ammonium, methylammonium, dimethylammonium, tetramethylammonium, bis-(tetramethylammonium), 2-hydroxypropylammonium, bis-(2-hydroxypropylammonium), ethanolammonium, diethanolammonium, triethanolammonium, bis-(triethanolammonium), phenylammonium, di-pyridylammonium, naphthylammonium, and quinolylammonium salts. The potassium, ammonium, tetramethylammonium, diethanolammonium, and triethanolammonium salts are preferred for use herein.

For use as sustained release grass growth retardants the AMPA salts described herein are preferably the sparingly water-soluble salts. These salts can be applied to grasses and slowly dissolve with rainfall to provide the desired AMPA growth retarding agent. Such sparingly soluble salts can be prepared by neutralization of the parent acid using, for example, an alkaline earth base. Suitable, preferred, sparingly water-soluble alkaline earth salts prepared in this manner include, for example, the calcium and magnesium salts of AMPA. Various sparingly water-soluble ammonium salts of AMPA wherein the cation is $N(R'')_4$ are also suitable for use herein. These include, for example, the sparingly water-soluble alkylammonium, alkanolammonium, and arylammonium salts of AMPA wherein at least one R'' moiety is hydrocarbyl of greater than $C_{10}$. Non-limiting examples of non-phytotoxic, sparingly water-soluble salts of AMPA useful herein include the dodecylammonium, tetradecylammonium, tridecanolammonium, bis-(tetradodecylammonium), 2-hydroxytridecylammonium, bis-(eicosanylammonium), hydroxyeicosanylammonium, thianthrenylammonium, xanthenylammonium, phenazinylammonium, and cyclohexadecylammonium salts.

The esters of AMPA are also suitable as sustained release grass growth retardants. Said esters can be applied to grasses and slowly degrade to the parent acid thereby providing the desired retardant activity. Various nonlimiting examples of AMPA esters suitable for use herein include the mono- and di-methyl, ethyl, propyl, isopropyl, butyl, isobutyl, and pentyl esters.

As a method aspect, the present invention encompasses applying a safe and effective amount of an aminomethylphosphonate compound to grasses (including cereals) to retard growth. Within the context of this invention the term "applying to grasses" includes application to grass seeds, grass seedlings, and matured grasses including both roots and above-ground portions. Application to grass seeds and roots can be achieved by contacting the seeds and roots with the aminomethylphosphonate compound before planting, or by applying the compound to the soil before or after planting.

It will be well understood by any plant biologist that, as with any plant growth regulation agent, the grass growth retardant compositions containing the aminomethylphosphonate compounds should be applied to particular grasses at certain optimum application rates (i.e., weight of regulator per unit of cultivated ground area) and at certain stages in the growth cycle of the grass if they are to achieve optimal growth retardant effect. The abundant variety of grass species coupled with the wide range of climatic and soil conditions which may be encountered make it difficult to specify exact application rates for all purposes. For general guidance, when applied broadcast to standing vegetation or to the soil, the term "safe and effective amount" based on weight of the aminomethylphosphonate compound will include application at a rate of at least about 0.01 lb/acre. Normally a range of from about 0.01 lbs/acre to about 50 lbs/acre and preferably within the range of from about 0.1 lb to about 20 lbs/acre per application is suitable. For some purposes repeated applications will be desirable.

The following examples more fully describe the affects of the aminomethylphosphonates, described herein, on grasses. The examples are intended only to be illustrative of the compositions and processes of this invention and are not intended to be limiting.

EXAMPLE I

Effect of Aminomethylphosphonic Acid (AMPA) on Young Red Fescue and Young Bluegrass Ten milliliters of an aqueous solution containing AMPA (1.08 gms/liter), 1% 1,2-propylene glycol, and 0.1 percent Tween-20 were sprayed onto each of five pots (4 inch × 4 inch) containing 26-day old Kentucky Bluegrass. This amount of AMPA corresponds to an approximate application of 8.6 lbs/acre. In a control experiment 5 pots of 26-day old Kentucky Bluegrass were sprayed with 10 ml of an aqueous solution containing 1 percent 1,2-propylene glycol and 0.1 percent Tween-20.

The percentage of growth of AMPA-treated grass relative to 100 percent for the surfactant-treated controls was determined on the basis of the mean clipping weights collected during the 4-8 weeks following treatment. The growth suppression of the AMPA-treated Kentucky Bluegrass ranged to a maximum of about 90 percent relative to control plants. This degree of suppression in growth relative to control pots was clearly observable on visual inspection.

The above experiment was repeated substituting 26-day old Pennlawn Red Fescue for Kentucky Bluegrass and equivalent results were obtained.

In the above experiment the 26-day old Kentucky Bluegrass is replaced by 26-day old Merian Bluegrass, Troy Bluegrass, Windsor Bluegrass, Delta Bluegrass, Nugget Bluegrass, Park Bluegrass, Chewings Fescue, Tall Fescue, Manhattan Perennial Ryegrass, Bayshore Bermudagrass, Everglades Bermudagrass, Santa Anna Bermudagrass, and Tifway Bermudagrass, respectively, and substantially equivalent results are obtained.

In the above procedure the AMPA is replaced by an equivalent amount of potassium aminomethylphosphonate, ammonium aminomethylphosphonate, tetramethylammonium aminomethylphosphonate, diethanolammonium aminomethylphosphonate and triethanolammonium aminomethylphosphonate, respectively, and substantially equivalent results are obtained.

In the above procedure the AMPA is replaced by an equivalent amount of calcium aminomethylphosphonate and magnesium aminomethylphosphonate, respectively, and sustained growth retardation is obtained.

In the above procedure the AMPA is replaced by an equivalent amount of methyl aminomethylphosphonate, diethyl aminomethylphosphonate, propyl aminomethylphosphonate, and dibutyl aminomethylphosphonate, respectively, and sustained growth retardation is obtained.

EXAMPLE II

Effect of Aminomethylphosphonic Acid (AMPA) on Mature Coarse Fescue

Plugs, approximately 3 inches in diameter, of mature Kentucky 31 Fescue were detached and allowed to grow in plastic trays (1.5 foot × 1.0 foot) containing Reddi Earth potting mixture for two weeks. During this two week period the plugs were fertilized once with 1.5 liters/tray of Peters 20-20-20 (1 gram/liter) and once with 1.5 liters/tray of one-half strength Hoagland's solution. The plugs were then transplanted to 4 inch × 4 inch pots and trimmed to 2.5 inches. One week later the foliage was trimmed to 2.5 inches and the clipping weights used to standardize the plugs in six sets of five pots each.

Five separate solutions of AMPA were prepared as follows: (1) 5.0 grams/liter; (2) 3.0 grams/liter; (3) 2.0 grams/liter; (4) 1.0 grams/liter; and (5) 0.5 grams/liter. The solvent system for each solution was water containing 1.0 percent 1,2-propylene glycol and 0.1 percent Tween-20. Five of the six sets of pots were treated using the five concentrations of AMPA, one concentration for each pot. The sixth, as a control, was treated with the Tween-20/glycol solution alone. Treatments were applied by dipping the foliar portion of the plug in the appropriate solution for two minutes. Each plug took up approximately 5 ml of solution. Since the plugs covered about one-half of the 4 inch × 4 inch surface area, the rates of AMPA application were approximately 43.0 lbs/acre, 27.8 lbs/acre, 17.2 lbs/acre, 8.6 lbs/acre, and 4.3 lbs/acre, respectively, for the five solutions.

Two weeks after treatment all plugs were trimmed to their original 2.5 inch height, and the mean clipping weights for each set of plugs were calculated. These data were used to determine the percentage of growth for all treated pots relative to 100 percent growth for the control plugs. The same procedure described 1bove was 9epeated four weeks from the day of treatment. The relative chlorophyll content in blade tissue was determined for each pot on each cutting date and height measurements were taken on a weekly basis.

In the above procedure, AMPA was effective in substantially retarding the vertical growth of Coarse Fescue. In addition the AMPA-treated grass produced more vegetative growth than did the surfactant-treated controls.

In the above procedure the Kentucky 31 Fescue was replaced by a mixture of Delta, Merian, and Windsor Bluegrass in a 1:1:1 ratio and equivalent growth control results were obtained.

In the above procedure the Kentucky 31 Fescue is replaced by bluegrasses such as Kentucky, Rough, Canada, Annual, Upland, Flyking Wood, and Bulbous; Fescues such as Chewings, Sheep, Hard, Hair and Meadow; Ryegrasses such as Perennial, and Italian; Bentgrasses such as Creeping, Colonial, Velvet, Redtop, and South German Mixed; Bermudagrasses such as Bayshore, Everglades, Santa Anna, and Tifway; Zoysiagrasses such as Emerald, Meyer and Midwest; St. Augustinegrasses; Centipedegrasses; Carpetgrasses; and Bahiagrasses, wheat, oats, rye-grain, rice, corn, and barley, respectively, and equivalent results are obtained.

In the above procedure the AMPA is replaced by an equivalent amount of potassium aminomethylphosphonate, ammonium aminomethylphosphonate, tetramethylammonium aminomethylphosphonate and triethanolammonium aminomethylphosphonate, respectively, and substantially equivalent results are obtained.

In the above procedure the AMPA is replaced by an equivalent amount of calcium aminomethylphosphonate and barium aminomethylphosphonate, respectively, and substantial sustained growth retardation is obtained.

In the above procedure the AMPA is replaced by an equivalent amount of methyl aminomethylphosphonate, diethyl aminomethylphosphonate, isopropyl aminomethylphosphonate, and di-isobutyl aminomethylphosphonate, respectively, and sustained growth retardation is obtained.

EXAMPLE III

Effect of Aminomethylphosphonic Acid (AMPA) on Wheat Seedlings

Wheat seeds were soaked in aerated distilled water for 24 hours. The seeds were then placed on a cheesecloth-covered wire stage and covered with an additional layer of cheesecloth. This assembly was placed in a 3 liter beaker so that the stage was 1 inch above the surface of a solution of $CaSO_4$ ($2 \times 10^{-4}$ M). The solution was covered with a watch glass, aerated, and placed in the dark. After 2 days, the watch glass and upper layer of cheesecloth were removed. After 5 days, the seedlings were removed and wrapped in urethane foam. The seedlings and plugs were placed in a hole in the lid of a plastic pot containing 1000 ml of $2 \times 10^{-4}$ M $CaSO_4$. These solutions were aerated and placed under fluorescent lights. After 24 hours, AMPA at three concentrations ($1 \times 10^{-3}$ M, $1 \times 10^{-4}$ M, and $1 \times 10^{-5}$ M) was added to the plastic pot solutions. Three replicate pots were used for each concentration of AMPA. Three other pots were left untreated as controls.

After 4 more days the solutions were discarded and replaced with half strength Hoagland's solution. To each fresh solution was added the same amount of AMPA as added previously. After 9 more days, the seedlings were removed from the pots and the total plant height above the crown measured.

The AMPA was effective in substantially retarding the stalk growth of wheat seedlings. A gradient effect was noted in going from the high rate of AMPA treatment to the low.

In the above procedure the AMPA is replaced by an equivalent amount of sodium aminomethylphosphonate, dipotassium aminomethylphosphonate, ammonium aminomethylphosphonate, dimethylammonium aminomethylphosphonate, bis-(tetramethylammonium)aminomethylphosphonate, dipyridylammonium aminomethylphosphonate, naphthylammonium aminomethylphosphonate, phenanthrylammonium aminomethylphosphonate, bis-(2-hydroxypropylammonium) aminomethylphosphonate, ethanolammonium aminomethylphosphonate, triethanolammonium aminomethylphosphonate, calcium aminomethylphosphonate, and the dodecylammonium, tetradecylammonium, tridecanolammonium, bis-(tetra-dodecylammonium), 2-hydroxytridecylammonium, bis-(eicosanylammonium), hydroxyeicosanylammonium, thianthrenylammonium, xanthenylammonium, phenazinylammonium, and cyclohexadecylammonium, aminomethylphosphonate salts, respectively, and substantially equivalent results are obtained.

In the above procedure the AMPA is replaced by an equivalent amount of methyl aminomethylphosphonate, diethyl aminomethylphosphonate, isopropyl aminomethylphosphonate, and di-isobutyl aminomethylphosphonate, respectively, and sustained growth retardation is obtained.

In the above procedure the wheat seedlings are replaced by oats and rye-grain, respectively, and substantially equivalent results are obtained.

In practice the aminomethylphosphonate compounds of the instant invention can be applied directly to grasses in either solid or liquid form. Preferably, the aminomethylphosphonates are incorporated into compositions which comprise a growth retarding amount of the AMPA compound, a plant-compatible carrier, and a plant-compatible surface active agent. As used herein, a plant-compatible carrier is defined as a solvent or dry bulking agent which has substantially no phytotoxic properties and provides a means whereby the aminomethylphosphonates can be diluted prior to application. Such compositions enable the compounds herein to be conveniently applied to grasses. As previously noted, these compositions can be solids, such as dusts, granules, or wettable powders, or they can be liquids such as solutions, emulsions, or aerosols. The carriers herein can be either biologically active or inert. Preferred carriers for use herein are fertilizers which in addition to providing a convenient diluent also provide nutritive benefits. The most preferred carriers for use herein are fertilizers comprising compounds of nitrogen, potassium, and phosphorus.

The retardant compositions disclosed herein generally contain an effective amount, i.e., from about 0.01 percent to about 50 percent, preferably 0.1 to 20 percent, by weight of the AMPA compound.

Grass growth retardant compositions in the form of dusts can be prepared by grinding and blending the aminomethylphosphonate compounds described above with a solid carrier such as talc, clay, silica, pyrophylite or solid fertilizers. Granular compositions can be prepared by impregnating the aminomethylphosphonate, usually dispersed or dissolved in a suitable solvent (e.g., water) onto or into granulated carriers such as the attapulgites or vermiculites, or granulated solid fertilizers. Usually a particle size range of from 0.01 mm. to 1.5 mm. is preferred. Wettable powders, which can be dispersed in water or oil to any desired concentration, can be prepared by incorporating surface active agent, as described below, into the concentrated dust compositions.

A highly preferred embodiment herein encompasses the aminomethylphosphonate compounds in solid "controlled" release formulations. The use of slow release carriers as an alternative to the use of sparingly water-soluble salts and esters is thoroughly described in Chemical Process Review No. 15, "Controlled Release Fertilizers", by Dr. R. Powell, incorporated herein by reference. As used herein the term "slow release carrier" includes granular compositions of water-soluble actives coated by an insoluble agent. Preferred materials suggested as coating agents include various waxes and paraffins, polymers, and sulfur. Wax coated compositions can be formulated by dispersing the active ingredients in molten wax, forming the dispersion into small particles, and cooling the composition below the melting point of the wax. The water resistance of the particles can be controlled by increasing or decreasing the amount of wax employed so as to provide proper release for the climatic conditions encountered. In areas of relatively heavy rainfall the water resistance should normally be high and the amount of wax in the dispersion should be relatively high. Conversely, in relatively dry areas the amount of wax should be relatively low. In addition various additives can be dissolved in the wax phase in order to improve the water resistance of the composition or to effect other benefits. U.S. Pat. No. 3,252,786, incorporated herein by reference, discloses the use of rosins or asphalts as effective slow-release additives. Other additives can be used, for example, to provide anticaking properties. Polymer coated compositions can be formulated by spraying various polymers on granular compositions. U.S. Pat. No. 3,214,259; 3,150,955; and 3,248,255, incorporated herein by reference, describe the use of urea-formaldehyde polymers. U.S. Pat. No. 3,223,518, incorporated herein by reference, describes the use of a copolymer of dicyclopentadiene and a glyceryl ester of an unsaturated organic acid. Other coating polymers include, for example, epoxidized polyester resins, urethanes, polystyrenes, tung oil, and polyethylene films. Sulfur coated compositions can be formulated as homogeneous melts. Elemental sulfur is an essential plant nutrient in many areas. Thus its use as a coating agent provides additional nutritive benefits. Sulfur coatings, however, tend to be very porous and present serious leaching problems. Therefore, sulfur coated compositions usually contain a sealant material. Various sealants suitable for use herein include, for example, petrolatum, waxes, and boiled linseed oil. Additives are useful to increase sulfur continuity and render the coating less permeable to moisture.

The following example is included to illustrate a typical controlled release composition.

EXAMPLE IV

A controlled release granular grass growth retardant composition is prepared in the manner of Controlled Release Fertilizers (above) page 141.

More particularly, a granular retardant composition comprising aminomethylphosphonic acid (AMPA) and granular Peter's 20:20:20 is prepared by spraying AMPA into a rotating drum containing the carrier-fertilizer so as to impregnate the carrier with an effective amount (ca. from 0.01 percent to about 50 percent by wt.) of the acid. These granules are subsequently coated with a polymeric controlled release agent by contacting the solid granules under acid conditions, preferably pH 3 to pH 4, with a concentrated aqueous urea-formaldehyde solution containing preferably 7 to 12 percent of water, based on the weight of the solution, and amounts of urea, formaldehyde and polymethylol ureas in solution corresponding to less than 1 mole of urea, preferably 0.4 to 0.9 mole of urea, per mole of formaldehyde, the proportion of coating solution being about one-twentieth to about one-tenth of the weight of the uncoated granules; subjecting said mixture to sufficient mechanical agitation to coat the pulverulent granules with the resulting viscous ureaformaldehyde resin; and continuing the mechanical agitation until hard non-caking granules are obtained in which the said urea-formaldehyde resin forms a thin crust which resists leaching. The resulting granular products are free flowing, relatively dust-free grass growth retardant compositions which are much more resistant to leaching by water than are the untreated materials.

The foregoing granular product is applied to Kentucky Bluegrass at rates from about 0.02 lbs/acre to about 100 lbs/acre and sustained, controlled release and ingestion of AMPA by the grass results. The grass so treated shows prolonged and substantial retardation of longitudinal growth without adverse effects on vegetative growth.

Grass growth retardant compositions in liquid form can be prepared by dissolving or dispersing the aminomethylphosphate compounds in liquid carriers. Water and water containing from about 0.1 percent to about 10 percent, preferably 1 percent by weight of 1,2-propylene glycol are preferred aqueous carriers. Such aqueous solutions can be dispersed on grasses under super-atmospheric pressure as aerosols. In addition to 1,2-propylene glycol other glycols and lower alcohols, such as 1,3-propylene glycol, liquid vicinal poly-ols having a molecular weight below about 3,000, ethanol, propanol, butanol, and the like, are suitable in such compositions.

Aqueous emulsions containing the aminomethylphosphonates can be prepared using various organic liquids. A surfactant, as detailed below, can be used to aid emulsification. Examples of suitable organic liquids which can be used in emulsions include alkyl and aryl hydrocarbons, chlorinated hydrocarbons, olefins, aldehydes, esters, ketones, and carboxylic acids, for example, 1-octene, decane, decanoic acid, benzene, xylene, chlorobenzene, isopropyl myristate, and the like. Mixtures of any of the above compounds, e.g., hydrocarbon mixtures such as the so-called "petroleum ethers", are also suitable.

Liquid fertilizers can be used as carriers to form liquid compositions by dissolving or dispersing the aminomethylphosphonate in the carrier. Liquid fertilizers comprising compounds of nitrogen, potassium and phosphorus are the most preferred liquid carriers for the aminomethylphosphonate compounds.

In another preferred embodiment, non-phytotoxic surfactants are incorporated into the retardant compositions to improve the spreadability of the compositions on grasses and to enhance penetration into the plant tissue.

The surfactants suitable for use in the foregoing solid and liquid compositions can be anionic, cationic, nonionic, ampholytic, or zwitterionic type. The nonionic types are preferred.

Examples of suitable anionic surface active agents for use herein are sodium salts of fatty alcohol sulfates having from 8-18 carbon atoms in the fatty chain and sodium salts of alkyl benzene sulfonates having from 9 to 15 carbon atoms in the alkyl chain. Examples of suitable nonionic surface active agents are the polyoxyethylene adducts of fatty alcohols having 10 to 18 carbon atoms and the polyethylene oxide condensates of alkyl phenols, wherein the alkyl chain contains from about 6 to 12 carbon atoms and the amount of ethylene oxide condensed onto each mole of alkyl phenol is from about 5 to 25 moles. Preferred herein are the polyethylene oxide condensates of sorbitan monooleate (Tweens) wherein the amount of ethylene oxide condensed onto each mole of sorbitan mono-oleate is about 10 to 40 moles. Examples of suitable cationic surface active agents are dimethyl dialkyl quaternary ammonium salts wherein the alkyl chains contain from about 8 to 18 carbon atoms and the salt forming anion is a halogen. Examples of suitable ampholytic surface active agents are derivatives of aliphatic secondary or tertiary amines in which one of the aliphatic substituents contains from about 8 to 18 carbon atoms and one contains an anionic water solubilizing group, e.g., sulfate or sulfonate. Specific suitable ampholytic surface active agents are sodium-3-dodecylaminopropionate and sodium-e-dodecyl amino propane sulfonate. Examples of suitable zwitterionic surface active agents are derivatives of aliphatic quaternary ammonium compounds in which one of the aliphatic constituents contains from about 8 to 18 carbon atoms and one contains an anionic water solubilizing group. Specific examples of zwitterionic surface active agents are 3-(N,N-dimethyl-N-hexadecylammonio)propane-1-sulfonate and 3-(N,N-dimethyl-N-hexadecylammonio)-2-hydroxy propane-1-sulfonate. Many other suitable surface active agents are described in "Detergents and Emulsifiers — 1973 Annual", John W. McCutcheon, Inc. When used in the liquid compositions herein for direct application to plants, the surface active agents should be present at levels from about 0.001 to about 0.5 percent and preferably from about 0.01 to about 0.1 percent by weight of the compositions. Concentrations above about 0.5 percent represent an economic waste and are usually avoided for this reason.

Another aspect of the present invention encompasses solid and liquid retardant compositions which include, in addition to the aminomethylphosphonate and carrier, a safe and effective amount of other biologically active adjuvants. As used herein the term "biologically active adjuvants" includes insecticides, fungicides, herbicides, fertilizers, antimicrobial agents, and the like. The selection of adjuvant depends primarily upon the needs of the individual user. Such adjuvants are compatible with the intended uses of the aminomethylphosphonates and the beneficial properties of such adjuvants control related problems such as weed and insect infestation, plant diseases, and microbial degradation of the active. The preferred adjuvants for use herein are herbicides, insecticides, anti-microbial agents and fertilizers. Nonlimiting examples of suitable adjuvants include, for example, herbicides such as chlorophenoxy herbicides, carbamate herbicides, toluidine herbicides and thiocarbamate herbicides; insecticides such pyrethroid insecticides, carbamate insecticides, and organophosphorus insecticides; and the like.

What is claimed is:

1. A process for retarding the growth of grasses comprising applying thereto a safe and effective amount of an aminomethylphosphonate compound selected from the group consisting of aminomethylphosphonic acid and the non-phytotoxic salts and esters thereof.

2. A process according to claim 1 wherein the aminomethylphosphonate compound is aminomethylphosphonic acid.

* * * * *